US010404893B2

(12) United States Patent
Sugahara

(10) Patent No.: US 10,404,893 B2
(45) Date of Patent: Sep. 3, 2019

(54) IMAGE PROCESSING APPARATUS, CONTROL METHOD, AND PROGRAM STORAGE MEDIUM THAT CONVERT GRAY HIGHLIGHT COLOR VALUES FROM NOT TARGETED TO BEING TARGETED FOR BACKGROUND COLOR REMOVAL

(71) Applicant: CANON KABUSHIKI KAISHA, Tokyo (JP)

(72) Inventor: Asako Sugahara, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/015,010

(22) Filed: Jun. 21, 2018

(65) Prior Publication Data
US 2018/0302533 A1 Oct. 18, 2018

Related U.S. Application Data

(63) Continuation of application No. 15/226,423, filed on Aug. 2, 2016, now Pat. No. 10,033,908.

(30) Foreign Application Priority Data

Aug. 26, 2015 (JP) ................. 2015-167008

(51) Int. Cl.
*H04M 1/58* (2006.01)
*H04N 1/60* (2006.01)
(Continued)

(52) U.S. Cl.
CPC ....... *H04N 1/4095* (2013.01); *G06K 15/1872* (2013.01); *G06K 15/1878* (2013.01);
(Continued)

(58) Field of Classification Search
CPC ........ H04N 1/409; H04N 1/4095; H04N 1/58; H04N 1/6008; G06K 15/1872; G06K 15/1878
See application file for complete search history.

(56) References Cited

U.S. PATENT DOCUMENTS

| 5,689,590 A | 11/1997 | Shirasawa et al. ........... 382/254 |
| 6,807,301 B1 | 10/2004 | Tanaka ......................... 382/169 |

(Continued)

FOREIGN PATENT DOCUMENTS

| JP | 01-213073 | 8/1989 |
| JP | 2008-005317 | 1/2008 |

*Primary Examiner* — Scott A Rogers
(74) *Attorney, Agent, or Firm* — Venable LLP

(57) ABSTRACT

An image processing apparatus has a first color conversion unit that converts a signal value at an achromatic grid point in a first color space among achromatic grid points in a color space, the signal value being closer to white than a first predetermined signal value, into a signal value that is even closer to white, and a second color conversion unit that converts a signal value at a grid point among grid points in the color space, the signal value being closer to white than a second predetermined signal value, into white are provided. The image processing apparatus converts a signal value of an input image using the first color conversion unit, and thereafter converting the signal value using the second color conversion unit.

5 Claims, 5 Drawing Sheets

(51) Int. Cl.
  *G06K 15/02* (2006.01)
  *H04N 1/407* (2006.01)
  *H04N 1/409* (2006.01)

(52) U.S. Cl.
  CPC ............ *H04M 1/58* (2013.01); *H04N 1/4072* (2013.01); *H04N 1/6008* (2013.01); *H04N 1/6022* (2013.01); *H04N 1/6094* (2013.01); *H04N 2201/0082* (2013.01)

(56) References Cited

U.S. PATENT DOCUMENTS

| | | | |
|---|---|---|---|
| 7,471,414 B2 * | 12/2008 | Xueping | H04N 1/4095 358/1.9 |
| 7,760,395 B2 | 7/2010 | Torikoshi | 358/1.9 |
| 7,860,310 B2 | 12/2010 | Yamamoto | 382/173 |
| 7,903,872 B2 | 3/2011 | Matsuzaki | 382/163 |
| 8,139,268 B2 * | 3/2012 | Matsuzaki | H04N 1/486 358/2.1 |
| 8,237,986 B2 | 8/2012 | Nakamura et al. | 358/1.9 |
| 8,395,832 B2 * | 3/2013 | Iwamoto | G06T 5/009 358/1.9 |
| 9,025,870 B2 | 5/2015 | Ozawa | G06K 9/4652 |
| 9,106,876 B2 | 8/2015 | Sawada | H04N 1/6075 |
| 9,251,614 B1 | 2/2016 | Tian | G06T 11/60 |
| 9,313,371 B2 * | 4/2016 | Kishimoto | H04N 1/58 |
| 10,084,942 B2 * | 9/2018 | Mori | H04N 1/6008 |
| 10,194,050 B2 * | 1/2019 | Sugahara | H04N 1/407 |
| 2005/0078867 A1 | 4/2005 | Kanno | 382/163 |

* cited by examiner

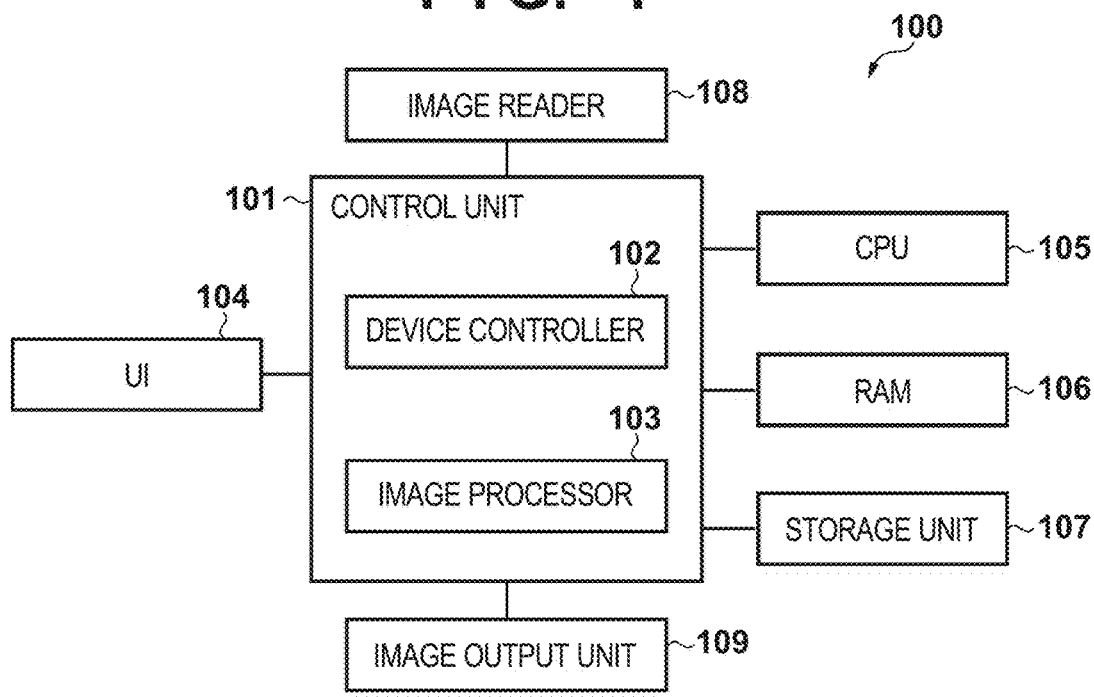
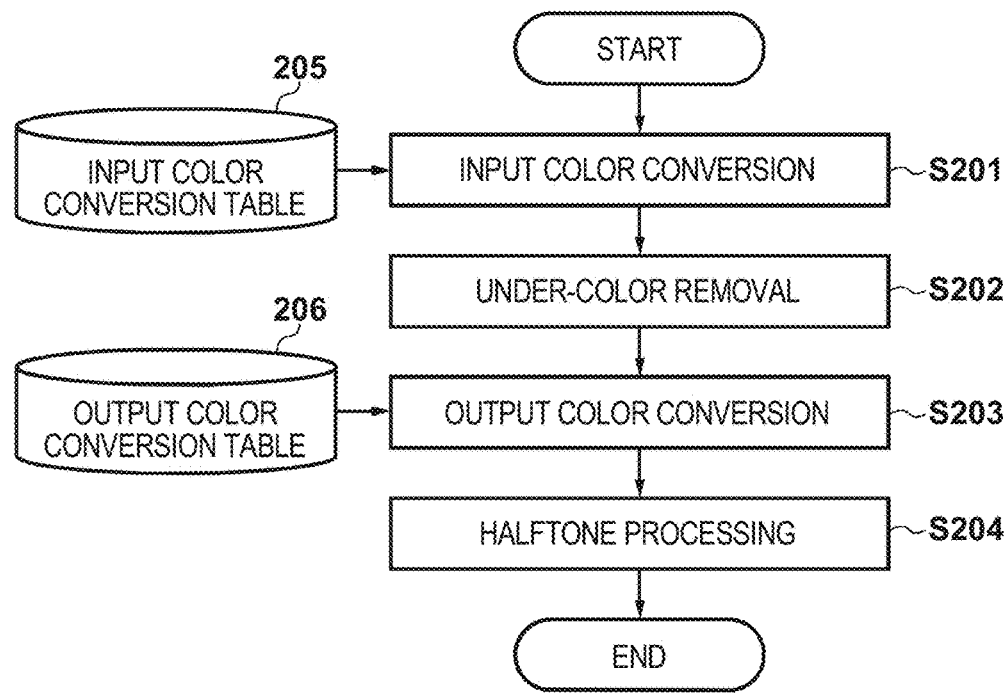

FIG. 7A

| No. | INPUT VALUE | OUTPUT VALUE | OUTPUT VALUE WITH COUNTERMEASURE TO BACKGROUND |
|---|---|---|---|
| 1 | (0,0,0) | (0,0,0) | (0,0,0) |
| ... | ... | ... | ... |
| 12 | (204,204,204) | (204,208,205) | (255,255,255) |
| 13 | (221,221,221) | (222,225,224) | (255,255,255) |
| 14 | (238,238,238) | (235,236,239) | (255,255,255) |
| 15 | (255,255,255) | (255,255,255) | (255,255,255) |

FIG. 7B

| No. | INPUT VALUE | OUTPUT VALUE | OUTPUT VALUE WITH COUNTERMEASURE TO BACKGROUND |
|---|---|---|---|
| 1 | (0,0,0) | (0,0,0) | (0,0,0) |
| ... | ... | ... | ... |
| 12 | (204,204,204) | (204,208,205) | (230,230,230) ~701 |
| 13 | (221,221,221) | (222,225,224) | (255,255,255) |
| 14 | (238,238,238) | (235,236,239) | (255,255,255) |
| 15 | (255,255,255) | (255,255,255) | (255,255,255) |

IMAGE PROCESSING APPARATUS, CONTROL METHOD, AND PROGRAM STORAGE MEDIUM THAT CONVERT GRAY HIGHLIGHT COLOR VALUES FROM NOT TARGETED TO BEING TARGETED FOR BACKGROUND COLOR REMOVAL

This application is a continuation of application Ser. No. 15/226,423 filed Aug. 2, 2016, currently pending; and claims priority under 35 U.S.C. § 119 to Japan Application 2015/167008 filed in Japan on Aug. 26, 2015; and the contents of all of which are incorporated herein by reference as if set forth in full.

BACKGROUND OF THE INVENTION

Field of the Invention

The present invention relates to an image processing apparatus, a method of controlling the image processing apparatus, and a storage medium.

Description of the Related Art

Typically, in copy processing in image processing apparatuses, various kinds of image processing are performed in order to accurately reproduce an original that has been read by a scanner. However, a more favorable image is obtained if show-through, which is an image on a back side of an original that appears on a front side, is not accurately reproduced. If paper itself is not white, as in the case of a newspaper, a more favorable image is obtained if the paper color is not accurately reproduced. Thus, a scanned image includes unnecessary information (hereinafter, background image). There is a function called under-color removal, which is a representative function for removing this background image. In this under-color removal, a signal value of each color that is a predetermined signal value or greater is converted into white, using a 1D-LUT (one dimensional look-up table). Thus, converting a signal value into white so as to not reproduce a pixel having this signal value will be hereinafter expressed as background removal. Meanwhile, if under-color removal is enhanced, highlights on an image are also removed, and therefore, Japanese Patent Laid-Open No. 2008-5317 proposes an image processing technique for determining a highlight region in an image and moderating under-color removal for this highlight region.

However, with the above technique, determination information regarding a color highlight region is essential for reproducing color highlights, and the 1D-LUT for under-color removal needs to be switched for one image in accordance with the determination.

SUMMARY OF THE INVENTION

An aspect of the present invention is to eliminate the above-mentioned problems which are found in the conventional technology.

A feature of the present invention is to provide a technique that enables a color highlight to be reproduced while removing an image such as show-through in an original.

According to a first aspect of the present invention, there is provided an image processing apparatus comprising: a first color conversion unit configured to convert a signal value at an achromatic grid point in a first color space among achromatic grid points in a color space, the signal value being closer to white than a first predetermined signal value, into a signal value that is even closer to white; a second color conversion unit configured to convert a signal value at a grid point among grid points in the color space, the signal value being closer to white than a second predetermined signal value, into white; and a control unit configured to perform control for converting a signal value of an input image using the first color conversion unit, and thereafter converting the signal value using the second color conversion unit, wherein the signal value that is even closer to white obtained by the conversion performed by the first color conversion unit is a signal value that is closer to white than the second predetermined signal value.

According to a second aspect of the present invention, there is provided a method of controlling an image processing apparatus, the method comprising: performing first color conversion for converting a signal value at an achromatic grid point in a first color space among achromatic grid points in a color space, the signal value being closer to white than a first predetermined signal value, into a signal value that is even closer to white; performing second color conversion for converting a signal value at a grid point among grid points in the color space, the signal value being closer to white than a second predetermined signal value, into white; and performing control for converting a signal value of an input image through the first color conversion, and thereafter converting the signal value through the second color conversion, wherein the signal value that is even closer to white obtained by the conversion performed in the first color conversion is a signal value that is closer to white than the second predetermined signal value.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram for describing a configuration of an image forming apparatus according to an embodiment of the preset invention.

FIG. 2 is a flowchart for describing processing performed by an image processor in a typical image forming apparatus.

FIG. 7A is a diagram illustrating a data configuration of the 3D-LUT according to the embodiment.

FIG. 7B is a diagram illustrating a data configuration of the 3D-LUT according to another embodiment.

DESCRIPTION OF THE EMBODIMENTS

Figure 3:
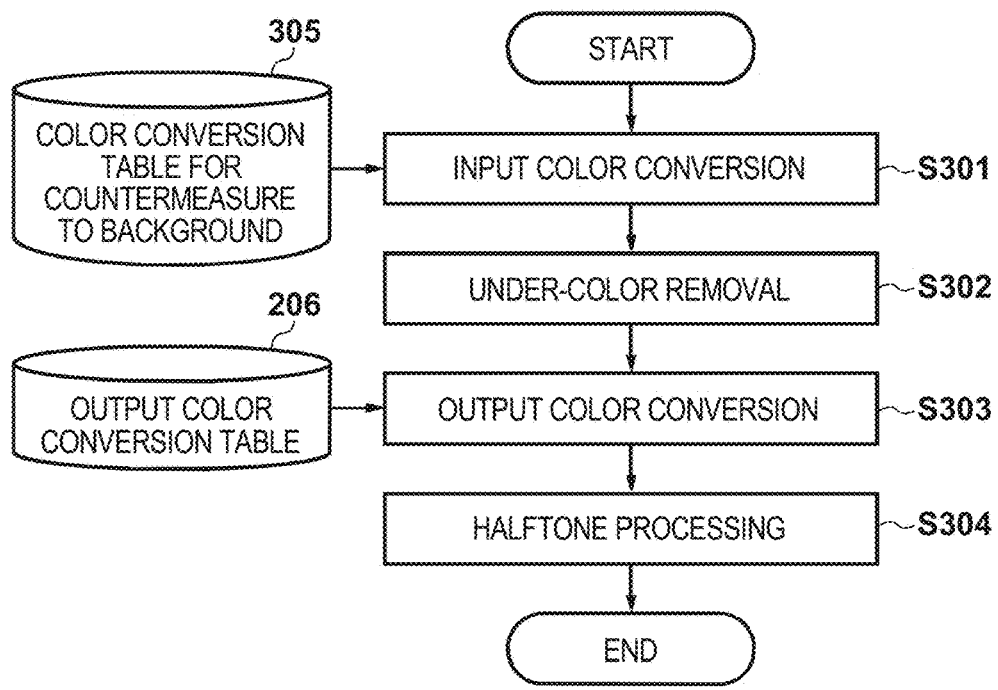
FIG. 3 is a flowchart for describing processing performed by an image processor in the image forming apparatus according to the embodiment.

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

FIG. 1 is a block diagram for describing a configuration of an image forming apparatus 100 according to the embodiment of the present invention.

In FIG. 1, a control unit 101 controls overall operation of the image forming apparatus 100, and includes a device controller 102 for controlling processing performed by the image forming apparatus 100, and an image processor 103 for optimizing image data. The control unit 101 obtains image data from an image reader 108, processes the image data, and stores the processed image data in a storage unit 107, using a CPU 105 and a RAM 106. The control unit 101 can also print the image data onto a sheet (recording medium) and output the image data to a device such as a monitor, using an image output unit 109. The control unit 101 is notified of various kinds of information through a UI (User Interface) 104 such as a pointing device or a keyboard, and the image processor 103 processes the image data based on the information of which the control unit 101 was notified. Alternatively, a value that is set through the UI 104 is saved in the storage unit 107 by the device controller 102, and the image processor 103 reads out the saved set value and processes the image data. Parameters for controlling the image forming apparatus 100, application programs for achieving processing related to the later-described embodiment, an OS, and the like are stored in the storage unit 107.

Note that the configuration of the image forming apparatus 100 shown in FIG. 1 is the minimum necessary configuration, and a network interface such as a router or a firewall, and the like may be added as necessary. A PC connected to the image forming apparatus 100, for example, may also be added.

FIG. 2 is a flowchart for describing processing performed by an image processor in a typical image forming apparatus. Here, no countermeasure to a background image is performed.

In step S201, an image processor performs color conversion processing for converting device-dependent RGB values into device-independent RGB values on image data obtained from an image reader, using an input color conversion table 205. This input color conversion table is a three-dimensional LUT (look-up table) (hereinafter, 3D-LUT). Next, the processing proceeds to step S202, and the image processor performs under-color removal processing for setting a signal value that is a predetermined signal value or larger to a signal value corresponding to white, using a one-dimensional look-up table (1D-LUT). Next, the processing proceeds to step S203, and the image processor performs output color conversion processing for converting RGB values of the image data into CMYK values, which represent toner colors, using an output color conversion table 206. Lastly, the processing proceeds to step S204, and the image processor performs halftone processing, such as screen processing and error diffusion processing.

The above-described processing is the minimum necessary image processing for copying, but any other necessary processing, such as image area determination processing and filtering processing may be added.

FIG. 3 is a flowchart for describing processing of the image processor 103 in the image forming apparatus 100 according to the embodiment of the present invention. Note that a program for executing this processing is stored in the storage unit 107, and the program is deployed in the RAM 106 at the time of execution, and the processing shown in this flowchart is achieved by the program being executed under the control of the CPU 105.

Here, processing related to the embodiment will be described, taking a countermeasure to a show-through backside image as an example. Note that, since the processing flow from step S302 to step S304 is basically the same as the above-described processing in step S202 to step S204 in FIG. 2, a feature of the embodiment will be described below.

When the image processor 103 according to the embodiment performs input color conversion in step S301, the image processor 103 uses a color conversion table for the countermeasure to background 305. This countermeasure to background performed using the 3D-LUT (three-dimensional look-up table) is a feature of this embodiment.

Figure 4:
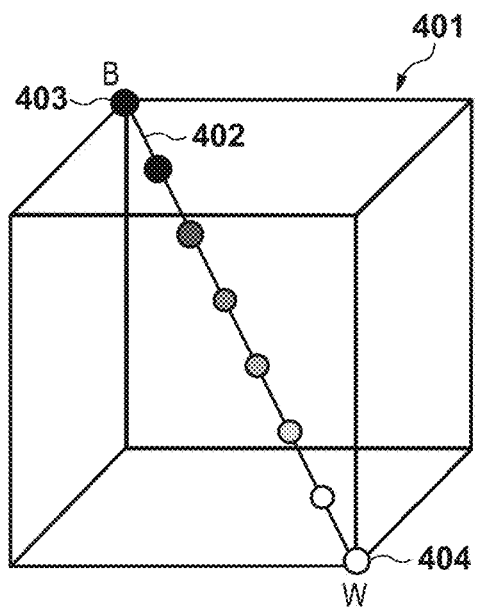
FIG. 4 is a diagram for describing a 3D-LUT and a countermeasure to background according to the embodiment.

FIG. 4 is a diagram illustrating a 3D-LUT 401 and the countermeasure to background according to the embodiment.

A neutral color axis 402 is a line that connects black (B) 403 to white (W) 404 in this 3D-LUT 401, and a plurality of grid points are arranged on this neutral color axis 402. Of course, grid points are not only arranged on the neutral color axis 402, but at points obtained by equally dividing the entire 3D-LUT 401.

Since a show-through image is an image that is an image on a backside of an original appearing in a face to be read, if the show-through image is read, the color and shape thereof is likely to be dull. That is to say, the color of a show-through image has a characteristic of being close to an achromatic color. For this reason, to remove show-through, processing for removing achromatic color highlights (i.e., gray highlights) is effective.

On the other hand, if highlights of colors other than achromatic colors (i.e., color highlights) are excessively removed, for example, a highlighter pen mark and a skin color highlight are not reproduced. For this reason, for the countermeasure to background, processing by which gray highlights are removed whereas color highlights are not particularly removed is necessary.

A feature of this embodiment lies in that, in a method for intensively removing gray highlights, grid point output values on the neutral color axis 402 in the 3D-LUT 401 are intentionally set to be brighter. By bringing a grid point output value of a highlight portion on the neutral color axis 402 close to white, a color near a gray highlight is converted into a brighter color, and in subsequent under-color removal processing (step S302), the converted color is converted into white. Thus, by combining the 3D-LUT with the 1D-LUT, it is possible to intensively remove gray highlights and remove show-through without determining whether or not each portion is a color highlight portion.

FIG. 7A is a diagram for describing a data configuration of the 3D-LUT 401 according to the embodiment. Note that details of a method for generating the 3D-LUT will be described later with reference to a flowchart in FIG. 6.

FIG. 7A shows 3D-LUT grid point data that deals with 8-bit data and indicates input values, output values, and output values in the case of performing the countermeasure to background in the 3D-LUT with 16 grid points.

FIG. 7A shows an exemplary data configuration of the 3D-LUT in which output values of some achromatic grid points are white (255, 255, 255). In the 3D-LUT that is used in input color conversion when accurately reproducing a scanned image, the input value and the output value at a grid point No. 15 (the point corresponding to a grid point (white) W404 in FIG. 4) are (255, 255, 255) and (255, 255, 255), respectively. The input value and the output value at the adjacent grid point No. 14 on the neutral color axis are (238, 238, 238) and (235, 236, 239), respectively. On the other hand, in the output values for the countermeasure to show-through, the output values at grid points No. 12 to No. 14, which are usually not white, are (255, 255, 255), which corresponds to white. Thus, in the 3D-LUT in FIG. 7A, input signal values at achromatic grid points within a range of a predetermined number of grid points from the white grid point (No. 15) are converted into an output signal value (255, 255, 255) that corresponds to white. Here, input signal values that are equal to a signal value (204, 204, 204) indicating show-through to be removed, and are closer to white than this signal value (204, 204, 204) are converted into the output signal value (255, 255, 255) that corresponds to white. Note that colors whose input values are in the vicinity of the neutral color axis in FIG. 7A (e.g., (221, 220, 222)) may be converted into (255, 255, 255) that corresponds to white.

Thus, a gray highlight whose input value indicates completely equal amounts of R, G, and B is converted into white, and even if an input value does not indicate equal amounts of R, G, and B, a color near a gray highlight is converted into a signal value corresponding to a grid point on the neutral color axis at the time of color conversion, and is accordingly converted into a brighter color than the color in the read image.

Note that although the output value for the countermeasure to show-through indicates white in FIG. 7A, this output value need only be a value greater than or equal to a threshold value, e.g., (230, 230, 230), based on which an input value is converted into white in the downstream 1D-LUT.

An advantage of performing the countermeasure to background using both the 3D-LUT and the 1D-LUT will now be described using FIGS. 5A and 5B.

Figure 5A:
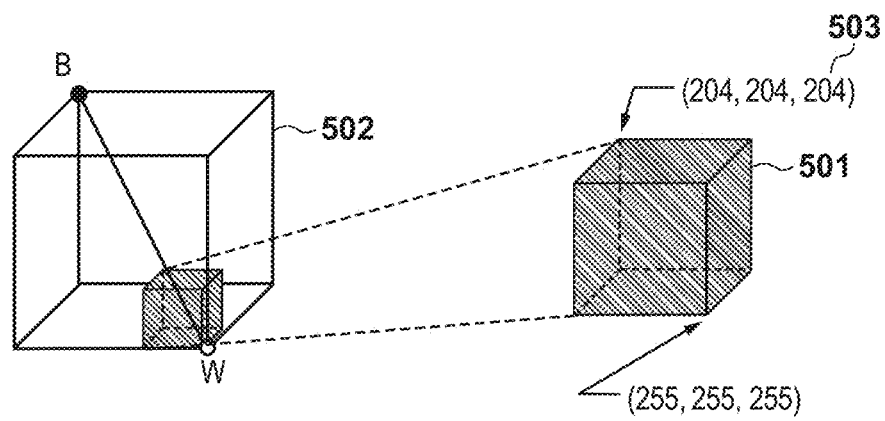
FIGS. 5A and 5B are diagrams for describing advantages of performing the countermeasure to background using both the 3D-LUT and a 1D-LUT according to the embodiment.
Figure 5B:
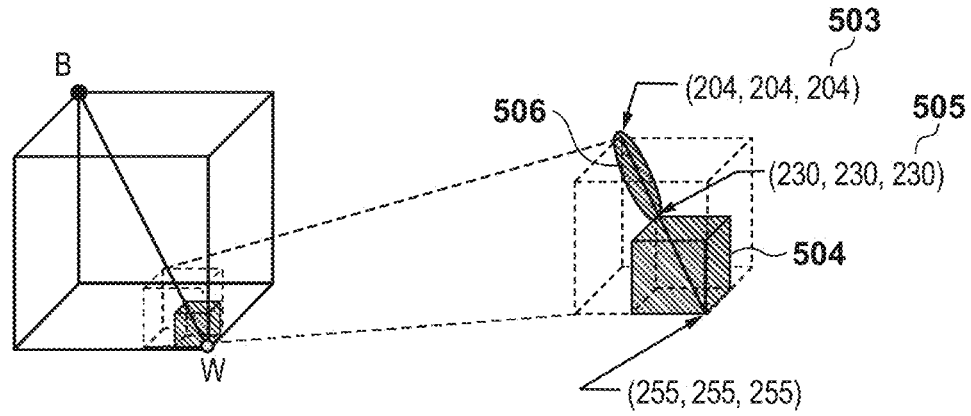

FIGS. 5A and 5B are diagrams for describing advantages of performing the countermeasure to background using both the 3D-LUT and the 1D-LUT in the embodiment. Here, a color space 501 that is converted into white after image processing in an entire color space 502 is shown in gray. FIG. 5A shows the case of removing show-through using only the 1D-LUT, and FIG. 5B shows the case of removing show-through using a combination of the 3D-LUT and the 1D-LUT. Here, for the sake of description, it is assumed that signal values of show-through to be removed are (204, 204, 204) and greater, and signal values of colors to be removed in order to further whiten the white color of the paper (i.e., for under-color removal) are (230, 230, 230) and greater. The former will be referred to as a show-through level 503, and the latter will be referred to as a paper white level 505.

As shown in FIG. 5A, in order to remove a signal value at the show-through level 503 using only the 1D-LUT, signal values of every color at the show-through level 503 or greater need to be converted into white. As a result, all highlights having signal values of "204" and greater are converted into white, and color highlights are removed.

In contrast, in the case of using both the 3D-LUT and the 1D-LUT as in FIG. 5B, only the paper white level 505 (230, 230, 230) is subjected to removal using the 1D-LUT. In FIG. 5B, a color space 504 that is to be converted into white using the 1D-LUT is shown in gray. A gray highlight portion from the paper white level 505 to the show-through level 503 is subjected to color conversion so as to be as bright as or brighter than the paper white level 505 using the above-described 3D-LUT 401. That is to say, a gray highlight portion (grid points on the neutral color axis) 506 from the paper white level 505 to the show-through level 503 is moved to the color space 504.

As a result, only gray highlights can be converted into white, while leaving a color highlight portion that is included in the gray highlight portion from the paper white level 505 to the show-through level 503 and removed in the case of show-through removal using only the 1D-LUT in FIG. 5A. Thus, only a show-through image can be completely removed while leaving the color highlight portion.

Figure 6:
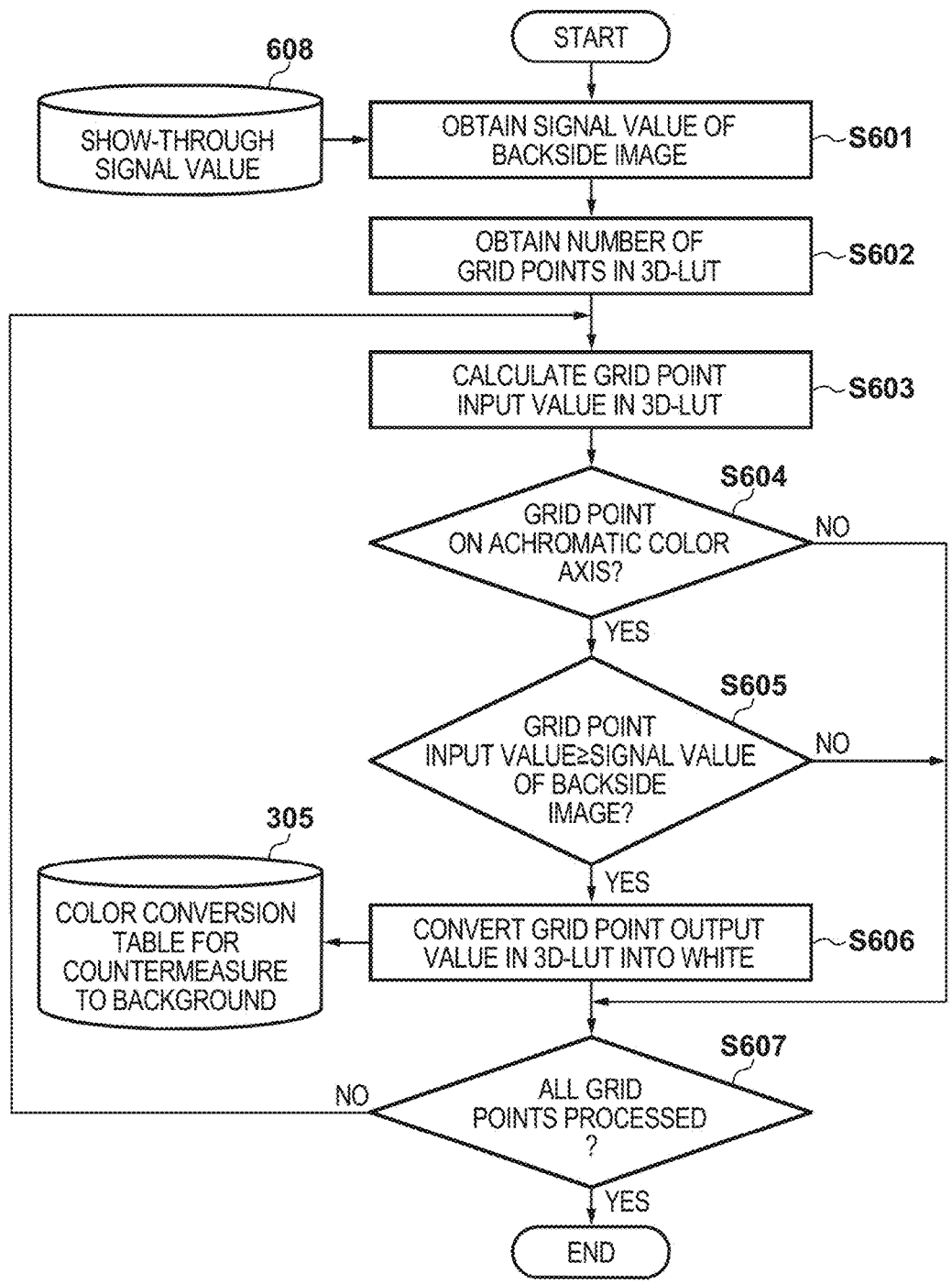
FIG. 6 is a flowchart for describing a method for generating the 3D-LUT performed by the image processor in the image forming apparatus according to the embodiment.

FIG. 6 is a flowchart for describing a method for generating the 3D-LUT performed by the image processor 103 in the image forming apparatus 100 according to the embodiment. Note that a program for executing this processing is stored in the storage unit 107, and the program is deployed in the RAM 106 at the time of execution, and the processing shown in the flowchart is achieved by the program being executed under the control of the CPU 105. The 3D-LUT may be generated by an external apparatus such as a PC (personal computer; not shown), using signal values obtained from the image forming apparatus 100, sent to the image forming apparatus 100 by a communication means (not shown), and saved in the storage unit 107. In this case, a control program for achieving 3D-LUT generation is stored in a storage unit (not shown) in the PC (not shown), and is loaded into a work memory and executed by a control unit.

Initially, in step S601, the CPU 105 reads a back side of a sheet (paper) on which an image is printed and obtains a show-through signal value 608. This show-through signal value 608 is an RGB value corresponding to the aforementioned show-through level 503, for example. Since the degree of show-through depends on the thickness of the paper, the density of the show-through image, and the type of the image reader 108 that reads the paper, and an exemplary method for determining the show-through signal value 608 will now be described.

A patch group, which includes a color patch having the highest density, is printed onto standard paper by the image forming apparatus 100. Then, the paper is placed on the image reader 108 with a face (back side) of this printed matter on which the patches are not printed as the front side, and the backside image is read. An RGB value of a portion corresponding to the back of the color patch having the highest density is extracted from the image signal obtained by reading the image, and the extracted RGB value is set to the show-through signal value 608. Alternatively, an RGB value may be extracted from other patch portions. Alternatively, the show-through signal value 608 may be similarly extracted with an original that is a general magazine, printed matter, or the like.

If the CPU 105 thus obtains, in step S601, the show-through signal value 608 that is a signal value of a backside image, the processing proceeds to step S602, and the CPU 105 obtains the number of grid points in the 3D-LUT. Next, the processing proceeds to step S603, and the CPU 105 calculates one grid point input value in the 3D-LUT based on the number of grid points in the 3D-LUT obtained in step S602.

Next, the processing proceeds to step S604, and the CPU 105 determines whether or not the calculated grid point input value indicates a grid point on the neutral color axis 402. Here, if it is determined that the calculated grid point input value does not indicate a grid point on the neutral color axis 402, the processing proceeds to step S607, and the CPU 105 determines whether or not all grid points in the 3D-LUT have been processed. If it is determined that not all grid points have been processed, the processing returns to step S603 and proceeds to processing for the next grid point. If it is determined that all grid points have been processed, this processing ends. Note that, in step S604, it may be determined that grid points in the vicinity of the neutral color axis are grid points on the neutral color axis, and then the processing may proceed to step S605.

If it is determined in step S604 that the calculated grid point input value indicates a grid point on the neutral color axis 402, the processing proceeds to step S605, and it is determined whether or not the grid point input value is larger (i.e., closer to white) than the signal value of the backside image obtained in step S601. If it is determined here that the grid point input value is larger than the signal value of the backside image, the processing proceeds to step S606, the output value at this grid point is converted into white, the updated color conversion table for the countermeasure to background 305 is saved in a work area of the RAM 106, and the processing proceeds to step S607. On the other hand, if it is determined in step S605 that the grid point input value is smaller than the signal value of the backside image obtained in step S601, the processing proceeds to step S607 without converting the output value at the grid point.

As described above, it is possible to generate the 3D-LUT in which the countermeasure to background for enabling the show-through signal value 608 to be removed has been performed.

Although the basic method for generating the 3D-LUT is as described above, other various kinds of adjustment can be performed.

For example, FIG. 7B shows the case where the show-through signal value 608 is separate from the grid point input value, as in the case where the show-through signal value 608 is (215, 215, 215), for example. At this time, it is necessary to not only convert, into white, a grid point output value at a grid point that is brighter than the show-through signal value 608, such as grid points No. 13 to 15, but also to adjust, as in a row 701 in FIG. 7B, a grid point output value at a grid point that is darker than the show-through signal value 608 (215, 215, 215) to be brighter, i.e., to (230, 230, 230) in FIG. 7B.

If the show-through signal value 608 is dark and is distant from the paper white level 505 in FIG. 5B, it may be difficult to remove show-through even if only grid point output values on the neutral color axis are adjusted. In such a case, show-through can be reliably removed by also slightly brightening up grid point output values in the periphery of the neutral color axis.

If an under-color removal level in the 1D-LUT is a fixed value, it is effective to generate the 3D-LUT based on the show-through signal value 608. On the other hand, in the case of automatically determining the under-color removal level, the 3D-LUT may be switched in accordance with the automatically determined under-color removal level. For example, the 3D-LUT may be switched such that, if the automatically determined under-color removal level is darker than a fixed value, the usual 3D-LUT in which the countermeasure to background is not performed is used, and if the under-color removal level is a brighter value than the fixed value, the 3D-LUT in which the countermeasure to show-through is performed is used. However, these are merely examples, and any other switching methods may be employed. Regarding a copy mode, if a mode that places importance on highlight reproduction is selected through the UI 104, use of the 3D-LUT in which the countermeasure to background is not performed is also effective.

Thus far, the 3D-LUT includes parameters that are generated in advance, but a method of automatically generating the 3D-LUT in the image forming apparatus 100 is also conceivable, for example.

That is to say, the control unit 101 in the image forming apparatus 100 obtains the show-through signal value 608, and generates the 3D-LUT in accordance with the flowchart shown in FIG. 6.

In a method for obtaining the show-through signal value 608 in this case, a predetermined chart is generated in advance, and a portion in which the show-through signal value 608 is to be obtained is set. Alternatively, a user may obtain the show-through signal value 608 by designating, through the UI 104, a show-through region in the image data that has been read and obtained by the image reader 108. These are merely examples, and any other methods may also be employed as long as the show-through signal value 608 can be obtained and the 3D-LUT can be automatically generated.

The signal value of the background image is not limited to the show-through signal value 608, and the 3D-LUT may be created using the color of the paper of a newspaper as the signal value of the background image. Alternatively, the 3D-LUT may be created using values of other gray highlights to be intensively removed as the background image signal values.

As described above, according to this embodiment, gray highlights in a show-through image can be removed, without removing color highlights, by combining the 3D-LUT with the 1D-LUT.

Note that the image processing apparatus in the above-described embodiment may also be an electrophotographic printer device, an inkjet printer, a thermal printer, or the like, for example, and the gist of the present invention is not limited by the type of printer. Printing material to be used in printing may also be a recording agent such as toner or ink, and the gist of the present invention is not limited by the type of printing material. Furthermore, the present invention is also effective in image processing performed when transmitting data as well as image processing for printing.

Other Embodiments

The embodiment of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment and/or that includes one or more circuits (e.g., application specific integrated circuit (ASIC)) for performing the functions of one or more of the above-described embodiment, and by a method performed by the computer of the system or apparatus by, for example, reading out and executing the computer executable instructions from the storage medium to perform the functions of one or more of the above-described described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-167008, filed Aug. 26, 2015, which is hereby incorporated by reference herein in its entirety.

What is claimed is:

1. An image forming apparatus comprising:
a memory device that stores a set of instructions; and
at least one processor that executes the set of instructions to:
obtain device-dependent RGB values;
convert the device-dependent RGB values into device-independent RGB values using a three-dimensional look-up table;
perform background color removal processing for the converted device-independent RGB values to convert a signal value being larger than a first predetermine signal value into white using a one-dimensional look-up table; and
convert the device-independent RGB values for which the background color removal processing has been performed into CMYK values,
wherein the at least one processor executes the set of instructions to:
in a conversion of the device-dependent RGB values using the three-dimensional look-up table, convert gray highlights RGB values that are not target for the background color removal processing of the device-dependent RGB values before the conversion, into RGB values that are target for the background color removal processing, and
in the conversion of the device-dependent RGB values using the three-dimensional look-up table, not convert highlights RGB values that are not gray and are not target for the background color removal processing of the device-dependent RGB values before the conversion, into RGB values that are target for the background color removal processing.

2. The image forming apparatus according to claim 1, wherein the highlights RGB values are RGB values larger than a second predetermined signal value being greater than the first predetermined signal value.

3. The image forming apparatus according to claim 1, wherein the gray highlights RGB values are RGB values greater than a second predetermined signal value being greater than the first predetermined signal value, and are RGB values corresponding to grid points on neutral color axis of the three-dimensional look-up table.

4. A method of controlling an image forming apparatus, the method comprising:
obtaining device-dependent RGB values;
converting the device-dependent RGB values into device-independent RGB values using a three-dimensional look-up table;
performing background color removal processing for the converted device-independent RGB values to convert a signal value being larger than a first predetermine signal value into white using a one-dimensional look-up table; and
converting the device-independent RGB values for which the background color removal processing has been performed into CMYK values,
wherein, in the converting of the device-dependent RGB values using the three-dimensional look-up table, converting gray highlights RGB values that are not target for the background color removal processing of the device-dependent RGB values before the conversion, into RGB values that are target for the background color removal processing, and
in the converting of the device-dependent RGB values using the three-dimensional look-up table, not converting highlights RGB values that are not gray and are not target for the background color removal processing of the device-dependent RGB values before the conversion, into RGB values that are target for the background color removal processing.

5. A non-transitory computer-readable storage medium storing a program for causing a processor to execute a method of controlling an image forming apparatus, the method comprising:
obtaining device-dependent RGB values;
converting the device-dependent RGB values into device-independent RGB values using a three-dimensional look-up table;
performing background color removal processing for the converted device-independent RGB values to convert a signal value being larger than a first predetermine signal value into white using a one-dimensional look-up table; and
converting the device-independent RGB values for which the background color removal processing has been performed into CMYK values,
wherein, in the converting of the device-dependent RGB values using the three-dimensional look-up table, converting gray highlights RGB values that are not target for the background color removal processing of the device-dependent RGB values before the conversion, into RGB values that are target for the background color removal processing, and
in the converting of the device-dependent RGB values using the three-dimensional look-up table, not converting highlights RGB values that are not gray and are not target for the background color removal processing of the device-dependent RGB values before the conversion, into RGB values that are target for the background color removal processing.

* * * * *